UNITED STATES PATENT OFFICE.

ERNEST BOURSIER, OF LOS ANGELES, CALIFORNIA, ASSIGNOR OF ONE-HALF TO A. ELIE L. DESTE, OF SAME PLACE.

MORDANT.

SPECIFICATION forming part of Letters Patent No. 497,229, dated May 9, 1893.

Application filed January 22, 1892. Serial No. 418,875. (No specimens.)

*To all whom it may concern:*

Be it known that I, ERNEST BOURSIER, a citizen of the United States, residing at Los Angeles, in the county of Los Angeles and State of California, have invented a new and useful Dye-Mordant, of which the following is a specification.

This invention relates to mordants for dye stuffs; and it has for its object to provide an improved mordant which on account of the various constituent elements thereof, and the nature and manner of their combination, will be of a permanent nature to receive fresh quantities of the coloring mixtures when the old colors become exhausted and need to be renovated.

The manufacturing of the mordant involves a composition from which can be produced an efficient mordant soap which can be used for dry cleaning of the articles to be dyed or for reducing the too heavy colors of such articles.

The mordant is produced by an alcoholic-ammoniacal saponification, which serves to produce a mordant which unlike other mordants is adapted for use in fixing and holding the colors in any description of article which may be dyed, such as feathers, leather, woods and in fact all kinds of goods.

With these and many other objects in view which will readily appear as the nature of the invention is better understood, the same consists in a mordant compound composed of the following named ingredients and which compound is only produced by the combination of the constituent elements in the manner hereinafter described: alcohol concentrated to ninety-five per cent.; aqua ammonia, twenty-two to twenty-five per cent.; oleic acid.; carbolic acid to five per cent., and refined naphtha. It will thus be seen that the base or foundation of the above compound is ammonia, alcohol, naphtha and an acid produced by saponification.

Now in considering the elements of the above composition of matter it will be noted that the same for the purpose of intelligent description, is divided into or composed of two distinct chemical solutions, namely an alkaline and an acid solution which are severally composed of such proportion of parts as are specified in the following formulation, to wit:

| Alkaline. | | Acid. | |
|---|---|---|---|
| Alcohol | 24 parts | Alcohol | 6 parts |
| Ammonia | 12 parts | Carbolic acid | 1 part |
| Olein | 46 parts | Naphtha | 1 part |
| | | Olein | 10 parts |
| 82 parts | | 18 parts | |

82 alkaline
18 acid 100 parts.

In preparing the mordant the above separate solutions or alkaline and acid principles are combined after the combination of the several ingredients of each. In the first instance, the alcohol and ammonia of the alkaline mixture are stirred together in a suitable glass or tin vessel and the olein or oil is then added to complete the same. The mixture is now saponified and the three liquids composing the same are intimately stirred during the entire period of saponification, which will be evidenced by the heat of the outside of the vessel, the solution produced being generally speaking "ammonium oleate." The solution is then allowed to cool by resting for a few minutes until the said solution is ready for an addition thereto to complete the naphthalic mordant.

The alcohol and carbolic acid of the acid solution are thoroughly mixed together in a separate vessel by stirring. The naphtha is added and stirred into the alcohol and carbolic acid, after which all the oil or olein is added and stirred in the solution until the same becomes well mixed and clear, the resultant acid solution produced being an intimate combination of the several ingredients.

The acid solution thus formed is added to the described alkaline or ammonium oleate solution and the mordant compound is completed and ready for use, said compound as completed being impregnated with naphtha. Now by employing the naphtha in connection with the compound formed, the best results are secured. By thus combining the naphtha, the same is rendered the best possible substitute for water in the art of dyeing, termed dry dyeing, and the naphtha in this relation becomes an excellent vehicle of all alcoholic coloring solutions. The carbolic acid employed is essentially important to secure this result. The carbolic acid is of heavier density than the naphtha, and therefore materially aids to sustain in regular suspension in the bath, all the various solutions of colors mixed with the mordant compound. The carbolic acid, also being a weak acid almost neutral, makes itself the proper supporter of naphtha, thereby avoiding all possible precipitations.

In using the above compound the same is mixed with naphtha in the proportion of ten per cent. of the quantity of naphtha employed; that is, for one hundred parts of naphtha, ten parts of the described compound are used. The naphtha and the compound are stirred for a few minutes, and the solution is then prepared to receive any suitable color solutions which are employed for dyeing. In connection with the mordant compound I employ various solutions of colors to make the dyeing baths. Among those preferably used in the aniline colors, for dark and light shades, are methylene blue, violet methyl, bismarck brown, erythrosin, auromine, indulines, new alcoholic blue, &c. The solutions of such colors when added to the compound just described form the dyeing baths into which the goods to be dyed are dipped.

In preparing the various coloring mixtures at the same time as preparing the mordant bath, it may be well to note the following steps:—First it should be noted that in mixing the coloring matter with their particular dissolvents, no alcoholic dissolvent of color should be placed in the bath of naphtha until it has first received the necessary quantity of mordant to make a steady color. It will be obvious that the quantity of mordant to be added to the various solvents of color cannot accurately be stated, but must of course vary with the experience of the dyer, and the nature of the dyeing, whether light or dark, as well as the nature of the coloring matter and the dissolvent employed.

The articles to be dyed in the dyeing bath impregnated with the herein described mordant are preferably dyed by the cold process, on account of the tendency of the alcohol to rapidly evaporate, and the goods are allowed to stand any length of time according to the shade desired.

It may be noted that with but a slight change in the ingredients of the mordant compound and allowing the solution to stand after the stage of saponification in the alkaline mixture, that a soap dissolved in naphtha is produced which can be advantageously employed in lighting dark colored fabrics, which removal of color is necessary before the said fabrics can be subjected to the dyeing processes. The composition of the said mordant soap proper may be stated as follows for one hundred parts:—ammonia fourteen; alcohol four; oleic acid seventy-six; and naphtha six. It may be observed that when the above mordant soap is applied to white fabric for dry cleaning, the quantity of oleic acid should only be about twenty-six parts together with fifty parts of stearic acid.

Having thus described my invention, what I claim, and desire to secure by Letters Patent, is—

1. The herein described mordant compound composed of ammonia, alcohol, naphtha, and oleic acid combined in the proportions and manner herein described and set forth.

2. The herein described mordant compound composed of alcohol, ammonia, carbolic acid, naphtha, and oleic acid, combined in the proportions and manner herein described and set forth.

In testimony that I claim the foregoing as my own I have hereto affixed my signature in the presence of two witnesses.

ERNEST BOURSIER.

Witnesses:
EM. QUARIE,
F. S. HICKS.